Figures 1, 2:
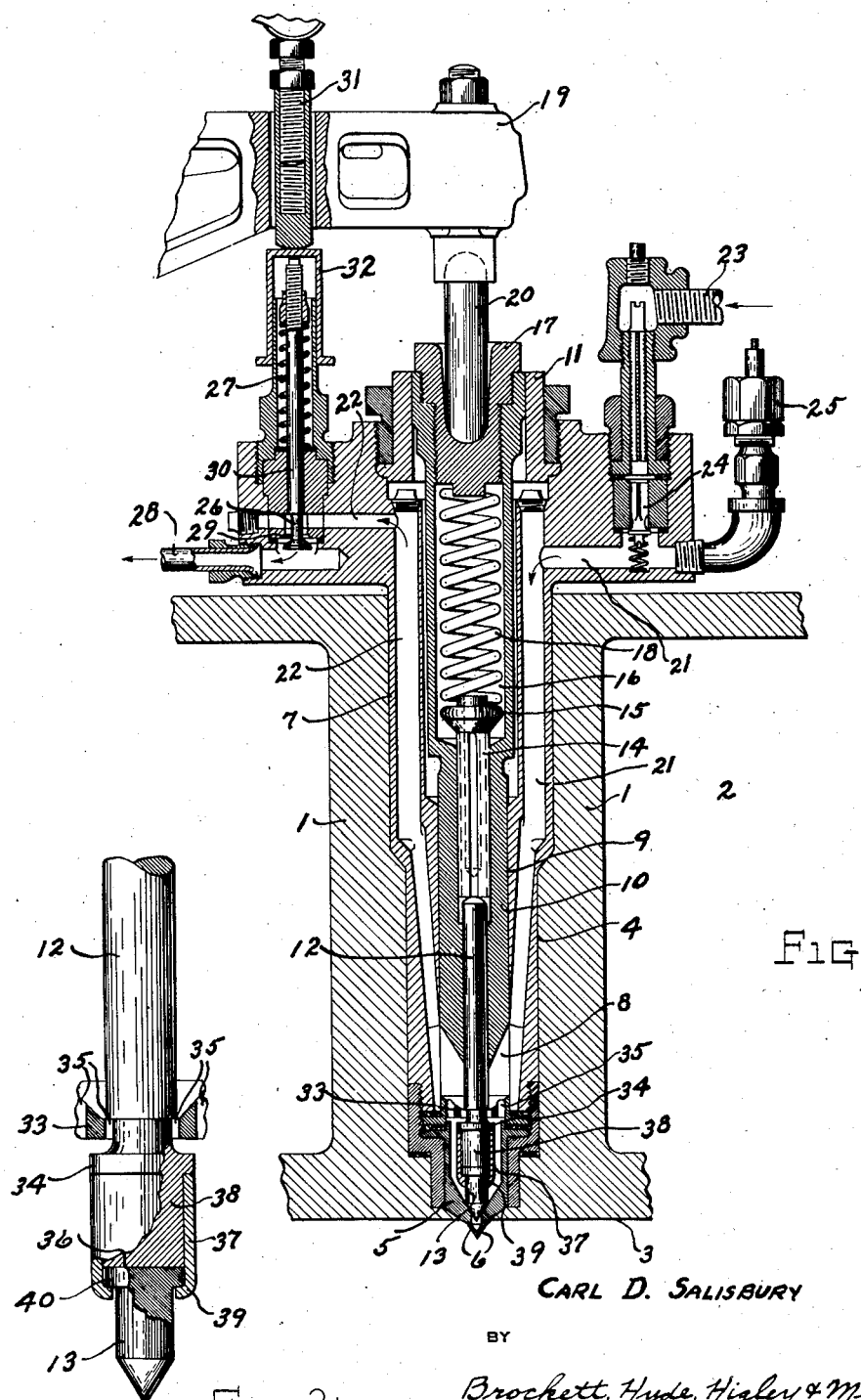

June 23, 1931. C. D. SALISBURY 1,811,596
INJECTION VALVE MEANS FOR HYDROCARBON MOTORS
Filed Oct. 24, 1929

INVENTOR
CARL D. SALISBURY
BY
Brockett, Hyde, Higley & Meyer
ATTORNEYS

Patented June 23, 1931

1,811,596

UNITED STATES PATENT OFFICE

CARL D. SALISBURY, OF CLEVELAND, OHIO, ASSIGNOR TO THE WINTON ENGINE COMPANY, OF CLEVELAND, OHIO, A CORPORATION OF OHIO

INJECTION VALVE MEANS FOR HYDROCARBON MOTORS

Application filed October 24, 1929. Serial No. 402,178.

This invention relates to fuel injection means for hydrocarbon motors which operate by internal combustion of heavy liquid fuels on the constant—or approximately constant—pressure cycle, and more specifically the invention has to do with that system of fuel injection wherein each combustion chamber of such motor is served by its own individual fuel injection pump.

In the present state of the art such a pump is necessarily of reciprocating type and its operation is so timed that the pump working stroke occurs practically at the instant of maximum compression in the combustion chamber served, the pump discharging directly into the chamber. It is necessary to control the power output of such an engine by in some manner metering the successive fuel charges. An object of the present invention is to provide means for the purpose whereby successive charges may be varied in quantity by varying the duration of the injection period, and more specifically by varying the timing of injection cutoff without affecting the timing of the commencement of injection.

To this end I employ an injection pump of constant stroke and timed to commence its working stroke as injection is to start, the pump delivering directly to its combustion chamber through the usual nozzle, and having sufficient capacity to deliver in one stroke the maximum charge. I associate with the pump structure valve means by which delivery to the combustion chamber may be bypassed to an overflow line.

It will be appreciated that the pump delivery pressure is necessarily extremely high since the maximum compression pressure of the combustion chamber must be exceeded by a wide margin that the injection period may be sufficiently short. Injection cutoff is accomplished by opening of this bypass or spill valve which obviously must therefore open against the maximum pump delivery pressure. A further object of the invention therefore is to so arrange the spill valve that it may be easily actuated under such conditions.

In order that passage through the nozzle may be prevented except during the injection period it is desirable that an injection valve seating within the nozzle be employed, and it is known to arrange the injection valve as by fluid differential, to be automatically unseated by pump delivery pressure. It is convenient to mount the injection valve stem in the pump plunger. Obviously the utmost in accuracy of fit of these parts is required and with the arrangement described it becomes exceedingly difficult to insure either alignment or maintenance thereof at the seat of the valve in the nozzle and at the bearing of the injection valve stem in the moving pump plunger. It is a further object of my invention to construct the injection valve with its head and stem portions of separate parts, relatively movable for individual self-alignment.

Still a further object of my invention is to provide stop means for limiting unseating movement of the injection valve, whereby reseating of the valve is unaffected by unseating inertia forces and the valve closing characteristics thus greatly improved.

The exact nature of the invention together with further objects and advantages thereof will be apparent from the following description taken in connection with the accompanying drawings in which Fig. 1 is an assembly view, largely in section, of fuel injection means illustrative of my invention; and Fig. 2 is a similar enlarged detail of pertinent parts of the injection valve.

With reference now to the drawings, 1 represents pertinent portions of the cylinder head casting of an engine of the class described, the head having the usual cooling water cavity 2 and being so arranged that its face 3 will form a wall of a combustion chamber. The head is step bored to provide a through opening 4 in which, adjacent the face 3, is positioned an injection nozzle 5 communicating by a number of minute orifices 6 with the combustion chamber. A valve block 7 fits in the bore 4 and is maintained securely seated therein by any usual convenient means.

The valve block forms a part of a pump structure having at its lower end a cavity 8, and having a bore 9 receiving the pump plunger 10 which has a long and accurate bearing in the bore 9 and at its opposite extremity another bearing in the bushing 11 as indicated. The plunger 10 is bored out to receive the stem 12 of an injection valve having a head 13 seating within the nozzle 5 to cut off communication between the orifices 6 and the cavity 8. The valve stem 12 is backed by a pin 14 which has a head 15 in a cavity 16 of the plunger 10. A plug 17 closes the end of this plunger cavity and a compression spring 18 is arranged between the block 17 and the head 15 of the pin 14. Thus by the spring 18 the injection valve head 13 is maintained yieldably seated against the nozzle 5, and the plunger 10 is yieldably urged to increase the effective volume of the cavity 8. Outward movement of the plunger is limited by valve actuating means details of which are immaterial here but indicated as including the rocker arm 19 and push rod 20.

The valve block 7 is drilled out as indicated to provide inlet and outlet passages 21 and 22 respectively, both of these passages communicating with the cavity 8. The inlet passage 21 has communication with an inlet fuel supply connection 23, the communication including a check valve 24 allowing flow only in the direction of the arrows. A safety valve 25 may also have connection with the inlet passage. The outlet passage 22 leads to a spill valve 26 yieldably maintained closed by a spring 27. Beyond the valve 26 is a connection 28 to overflow.

It will be apparent that what has thus far been described comprises pump structure, the cavity 8 comprising an expansible metering chamber, outward motion of the plunger under the action of the spring 18 drawing fuel into the chamber 8 past the valve 24, and inward motion of the plunger by actuation of the rocker arm 19 decreasing the volume of the metering chamber.

Were no orifices 6 provided or were the valve 13 positively maintained seated to cut off access to these orifices, delivery of the pump would be out through the passage 22 past the valve 26 to the overflow connection. However, the sectional area of the injection valve stem 12 is greater than the orifice in the nozzle upon which the valve head 13 seats, so that fluid pressure within the chamber 8 causes the injection valve to open against the spring 18. Likewise, the orifice 29 closed by the head of the spill valve 26 is only slightly greater than the diameter of the stem 30 thereof so that this valve is substantially balanced against pressure which would otherwise unseat the valve; and the spring 27 although relatively light is amply sufficient to maintain the valve seated against enormous pressures in the passage 22. The parts are so proportioned and arranged that the injection valve will open under fluid pressures insufficient to open the spill valve.

Thus in operation unless the spill valve is opened by external forces the entire charge of the pump will be delivered directly through the orifices 6 into the combustion chamber of the engine. However, at any time during the injection the spill valve may be easily opened. Opening of the spill valve so relieves pressure in the chamber 8 that the injection valve will immediately seat to cut off communication between the metering chamber and the combustion chamber. Hence if the injection stroke of the pump plunger be properly timed, the spill valve may likewise have associated therewith mechanism for causing it to open and this mechanism may be timed and variably so by adjustment, and will serve to determine the timing of injection cutoff without affecting in the least the timing of injection commencement. Such mechanism forms no part of the present invention but a push rod 31 is indicated as acting upon the stem 30 of the overflow valve through a cap 32 for the purpose.

In order that the injection valve may seat with increased rapidity its opening stroke is limited by a stop 33 cooperable with a flange 34 on the injection valve stem 12 and having openings 35 for fuel passage therethrough. Were it not for this stop unseating movement of the injection valve would be considerably greater, and the inertia forces of opening and closing would prolong the closing time.

In order that the bearing of the injection valve stem 12 in the movable plunger 10 shall not affect the seating of the head of the injection valve 13 in the nozzle 5, separate parts are employed for these members as indicated Fig. 2. These parts have transverse abutting faces 36 nicely finished, and the surfaces are maintained in abutting relation by a sleeve 37 having a press fit upon the end 38 of the valve stem 12. The sleeve 37 has an inward flange 39 engaging a flange 40 upon the valve head, these flanges forming cooperative shoulders as indicated for the purpose; and the shown clearances between these flanges and the adjacent parts in their transverse planes allow relative sliding movement of the faces 36 without relative angular movement of the parts. Thus the axes of the stem and head of the injection valve may be allowed to shift with relative parallel movement, that these parts may adjust themselves accurately to their respective other cooperating parts.

What I claim is:

In a hydrocarbon motor having a combustion chamber, fuel injection apparatus therefor comprising means forming a metering chamber adjacent and having communication with said combustion chamber, plunger means arranged to vary the metering chamber volume, an injection valve arranged to seat within said metering chamber to cut off said communication and to be unseated by metering chamber fluid pressure, yieldable means for opposing valve unseating movement, and stop means cooperative with said valve for limiting said unseating movement whereby reseating of said valve is unaffected by unseating inertia forces.

In testimony whereof I hereby affix my signature.

CARL D. SALISBURY.